United States Patent
Yang et al.

(10) Patent No.: US 10,228,263 B2
(45) Date of Patent: Mar. 12, 2019

(54) SYSTEM AND METHOD FOR ATTITUDE CORRECTION

(71) Applicant: Google LLC, Mountain View, CA (US)

(72) Inventors: Qingxuan Yang, Beijing (CN); Edward Chang, Palo Alto, CA (US)

(73) Assignee: Google LLC, Mountain View, CA (US)

(*) Notice: Subject to any disclaimer, the term of this patent is extended or adjusted under 35 U.S.C. 154(b) by 343 days.

(21) Appl. No.: 14/776,052

(22) PCT Filed: Mar. 15, 2013

(86) PCT No.: PCT/CN2013/072752
§ 371 (c)(1),
(2) Date: Sep. 14, 2015

(87) PCT Pub. No.: WO2014/139170
PCT Pub. Date: Sep. 18, 2014

(65) Prior Publication Data
US 2016/0033301 A1    Feb. 4, 2016

(51) Int. Cl.
| | |
|---|---|
| *G01C 17/38* | (2006.01) |
| *G01C 25/00* | (2006.01) |
| *G01C 21/16* | (2006.01) |
| *H04W 4/02* | (2018.01) |
| *G01C 9/02* | (2006.01) |
| *G06F 1/04* | (2006.01) |
| *G06F 3/0346* | (2013.01) |

(52) U.S. Cl.
CPC .............. *G01C 25/00* (2013.01); *G01C 9/02* (2013.01); *G01C 21/16* (2013.01); *G06F 1/04* (2013.01); *G06F 3/0346* (2013.01); *H04W 4/027* (2013.01)

(58) Field of Classification Search
CPC .......... G01C 25/00; G01C 9/02; G01C 21/16; G06F 1/04; G06F 3/0346; H04W 4/027
USPC .......................................................... 702/94
See application file for complete search history.

(56) References Cited

U.S. PATENT DOCUMENTS

| | | | |
|---|---|---|---|
| 8,321,168 B2 | 11/2012 | Eriksson | |
| 8,393,213 B2 | 3/2013 | Uemura | |
| 9,215,311 B2* | 12/2015 | Nomachi | G01C 21/20 |
| 9,733,712 B2* | 8/2017 | Takahashi | G06F 3/017 |
| 2012/0278023 A1 | 11/2012 | Zheng | |
| 2013/0050120 A1* | 2/2013 | Takahashi | G06F 3/017 |
| | | | 345/173 |

FOREIGN PATENT DOCUMENTS

CN    102297693    3/2013

OTHER PUBLICATIONS

International Search Report published in PCT/CN2013/072752 dated Sep. 18, 2014—3 pages.

* cited by examiner

*Primary Examiner* — Fernando Hidalgo
(74) *Attorney, Agent, or Firm* — McDonnell Boehnen Hulbert & Berghoff LLP (57) ABSTRACT

A system and method for attitude correction is provided. An acceleration and an attitude of an electronic device are detected. A period of time where a velocity of the electronic device at the beginning of the period of time and a velocity of the electronic device at the end of the period of time are equal is identified. An attitude correction is calculated based on the identified period of time and the detected acceleration of the electronic device during the period of time. The detected attitude of the electronic device is corrected with the calculated attitude correction.

20 Claims, 6 Drawing Sheets

SYSTEM AND METHOD FOR ATTITUDE CORRECTION

BACKGROUND

The subject technology generally relates to correcting an attitude, and in particular, relates to correcting a determined attitude of an electronic device.

The attitude of an electronic device is often used to transform the electronic device's position in a relative coordinate system to a global coordinate system. Many electronic devices utilize a gyroscope to determine attitude. While a gyroscope may accurately detect the orientation of an electronic device relative to the electronic device's previous orientation, detecting attitude with the gyroscope is often imprecise and inaccuracies may compound over time. Accordingly, determining the attitude of an electronic device using only a gyroscope may make it difficult to accurately determine the electronic device's attitude.

SUMMARY

According to one aspect of the subject technology, a computer-implemented method for attitude correction is provided. The method comprises detecting an acceleration and an attitude of an electronic device. The method further comprises detecting an acceleration and an attitude of an electronic device. The method further comprises identifying a period of time wherein a velocity of the electronic device at the beginning of the period of time and a velocity of the electronic device at the end of the period of time are equal. The method further comprises calculating an attitude correction based on the identified period of time and the detected acceleration of the electronic device during the period of time. The method further comprises correcting the detected attitude of the electronic device with the calculated attitude correction.

According to another aspect of the subject technology, a system for attitude correction is provided. The system comprises one or more processors, and a machine-readable medium comprising instructions stored therein, which when executed by the processors, cause the processors to perform operations comprising detecting an acceleration and an attitude of an electronic device. The operations further comprise identifying a period of time wherein a velocity of the electronic device at the beginning of the period of time and a velocity of the electronic device at the end of the period of time are equal. The operations further comprise calculating an attitude correction based on the identified period of time and the detected acceleration of the electronic device during the period of time, wherein calculating the attitude correction comprising solving $$\int_{t1}^{t2} A'_{abs}\, dt = \int_{t1}^{t2} A_{abs} \times \Delta\varphi\, dt = -g(t_2 - t_1) \times \Delta\varphi$$

for $\Delta\varphi$, wherein, $A'_{abs}$ is a measured acceleration in an absolute coordinate frame, $A_{abs}$ is a true value of acceleration in an absolute coordinate frame, $t_1$ is the beginning of the period of time, $t_2$ is the end of the period of time, g is a gravitational force, and $\Delta\varphi$ is an attitude variance of the electronic device during the period of time. The operations further comprise correcting the detected attitude of the electronic device with the calculated attitude correction.

According to another aspect of the subject technology, a machine readable medium for attitude correction is provided. The machine readable medium comprising instructions stored therein, which when executed by a processor, cause the processor to perform operations comprising detecting, an acceleration and an attitude of a smartphone device, wherein the acceleration of the smartphone device is detected by an accelerometer component of the smartphone device, and wherein the attitude of the smartphone device is detected by a gyroscope component of the smartphone device. The operations further comprise identifying a period of time wherein a velocity of the smartphone device at the beginning of the period of time and a velocity of the smartphone device at the end of the period of time are equal. The operations further comprise calculating an attitude correction based on the identified period of time and the detected acceleration of the smartphone device during the period of time, wherein calculating the attitude correction comprising solving $$\int_{t1}^{t2} A'_{abs}\, dt = \int_{t1}^{t2} A_{abs} \times \Delta\varphi\, dt = -g(t_2 - t_1) \times \Delta\varphi$$

for $\Delta\varphi$, wherein, $A'_{abs}$ is a measured acceleration in an absolute coordinate frame, $A_{abs}$ is a true value of acceleration in an absolute coordinate frame, $t_1$ is the beginning of the period of time, $t_2$ is the end of the period of time, g is a gravitational force, and $\Delta\varphi$ is an attitude variance of the smartphone device during the period of time. The operations further comprise correcting the detected attitude of the smartphone device with the calculated attitude correction.

According to another aspect of the subject technology, a system for attitude correction is provided. The system comprises an accelerometer configured to detect acceleration of an electronic device and provide an acceleration signal. The system further comprises a gyroscope configured to detect an orientation of the electronic device and provide an attitude signal based on the detected orientation. The system further comprises an attitude module configured to determine an attitude of the electronic device based on the attitude signal provided by the gyroscope. The system further comprises a correction module configured to receive the acceleration signal from the accelerometer and the attitude signal from the gyroscope, wherein the correction module is further configured to identify, based on the received acceleration signal and the received attitude signal, a period of time wherein a velocity of the electronic device at the beginning of the period of time and a velocity of the electronic device at the end of the period of time are equal, and wherein the correction module is further configured to calculate an attitude correction based on the identified period of time and the detected acceleration of the electronic device during the period of time and provide the attitude correction to the attitude module, and wherein the attitude module is further configured to correct the determined attitude of the electronic device based on the attitude correction.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology. In the drawings.

DETAILED DESCRIPTION

The detailed description set forth below is intended as a description of various configurations of the subject technology and is not intended to represent the only configurations in which the subject technology may be practiced. It will be apparent, however, that the subject technology is not limited to the specific details set forth herein and may be practiced without these specific details. In some instances, structures and components are shown in block diagram form in order to avoid obscuring the concepts of the subject technology.

In accordance with the subject disclosure, a system and a method for attitude correction are provided. The system uses signals from a gyroscope and an accelerometer to compute attitude of an electronic device. The gyroscope detects an orientation of the electronic device and outputs an attitude signal. The accelerometer detects acceleration of the electronic device and outputs an acceleration signal. The system determines an attitude variance to correct the detected attitude based on the acceleration signal.

In one example, acceleration of electronic device in an absolute coordinate frame over the period of time between $t_1$ and $t_2$ can be calculated by solving $$\int_{t1}^{t2} A_{abs} dt = (V_{t2} - V_{t1}) - g(t_2 - t_1), \quad (1)$$

where $A_{abs}$ is a true value of acceleration in an absolute coordinate frame, $t_1$ is the beginning of the period of time, $t_2$ is the end of the period of time, and g is a gravitational force. By picking $t_1$ and $t_2$ to correspond to periods of time where $V_{t1}$ and $V_{t2}$ are equal, equation (1) simplifies to $$\int_{t1}^{t2} A_{abs} dt = -g(t_2 - t_1). \quad (2)$$

A measured acceleration in an absolute coordinate frame can be calculated by solving $$A'_{abs} = A'_{rel} \varphi' \quad (3)$$

for $A'_{abs}$, where $A'_{abs}$ is the measured acceleration in an absolute coordinate frame, $A'_{rel}$ is the acceleration in the relative frame, and $\varphi'$ is the measured attitude. Furthermore, a true value of acceleration in an absolute coordinate frame can be calculated by solving $$A_{abs} = A_{rel} \varphi \quad (4)$$

for $A_{abs}$, where $A_{abs}$ is the true value of acceleration in an absolute coordinate frame, $A_{rel}$ is the true value of acceleration in the relative frame, and $\varphi$ is the true value of attitude. For change of $\varphi$ in a small period of time, t can be written as $$\varphi_{t+\Delta t} = (\overline{\omega}_t dt) \times \varphi_t, \quad (5)$$

where $\varphi_t$ is attitude at time t, $\Delta t$ is the change of t over the small period of time, and $\omega$ is the angular velocity at time t. If attitude at $t_1$ deviates from its real value, then measured attitude at $t_1$ can be calculated by solving $$\varphi'_{t1} = \varphi_{t1} \times \Delta \varphi \quad (6)$$

where $\varphi'_{t1}$ is the measured attitude at $t_1$, $\varphi_{t1}$ is the true value of attitude at $t_1$, and $\Delta \varphi$ is the change of $\varphi$ over the small period of time.

Measured attitude at $t_1$ would remain erroneous unless rectified. In this case, the measured attitude at t is given by $$\varphi'_t = \varphi_t \times \Delta \varphi, \quad (7)$$

where t can b any time including $t_1$. Since acceleration under relative coordinate frame can be measured directly, $A'_{rel}$ can be assumed to equal $A_{rel}$. Under such conditions, attitude variance over a period of time between $t_1$ and $t_2$ can be calculated by solving $$\int_{t1}^{t2} A'_{abs} dt = \int_{t1}^{t2} A_{abs} \times \Delta \varphi dt = -g(t_2 - t_1) \times \Delta \varphi \quad (8)$$

for $\Delta \varphi$, where $A'_{abs}$ is a measured acceleration in an absolute coordinate frame, $A_{abs}$ is a true value of acceleration in an absolute coordinate frame, $t_1$ is the beginning of the period of time, $t_2$ is the end of the period of time, g is gravitational force, and $\Delta \varphi$ is an attitude variance of the electronic device during the period of time.

In order to find a proper time pair $t_1$ and $t_2$, the system determines static/stationary point pairs in the electronic device's movement or synchronized point pairs in the electronic device's periodic movement. In one example, the system looks for two times when the electronic device is stationary to find static/station point pairs. In this case, $V_{t1} - V_{t2}$ is zero. If the electronic device is engaged in periodic motion, the system looks for two synchronized points, where the electronic device is at the same stage of periodicity. In this case, $V_{t1} - V_{t2}$ can also be assumed to be zero. The system then uses timestamps associated with the determined point pairs to compute attitude variance.

In one example, the system periodically captures and stores an acceleration signal from the accelerometer in a signal queue at a first interval $\Delta t_1$. The difference between each captured acceleration signal and the previously captured acceleration signal is compared against a threshold value. If the difference between consecutively captured acceleration signals remains below the threshold value over a second time interval $\Delta t_2$, the electronic device is considered to be in a static state over the second time interval $\Delta t_2$. Timestamps for the beginning and end of the second time interval are outputted to solve for the variance in attitude.

In another example, the system processes an acceleration signal from the accelerometer to determine periodic movement of the electronic device. The system decomposes the acceleration signal using a wavelet transform (e.g., D4 Daubechies wavelet). The wavelet is then transformed into a binary wave using a threshold, and successive rising edges of the binary wave are identified as points where the electronic device is at the same stage of periodicity. Timestamps corresponding to the rising edges are outputted to solve for the variance in attitude.

The system uses the gyroscope to continuously detect the attitude of the device and corrects the attitude whenever either of the two methods summarized above output timestamps for either static/stationary points or synchronized points.

Figure 1:
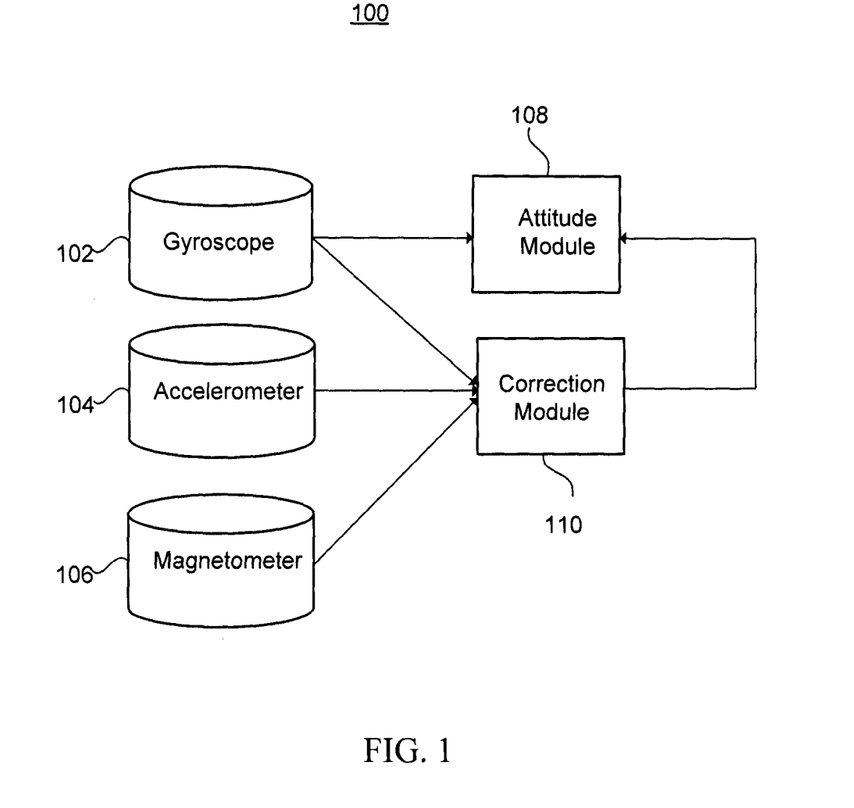
FIG. 1 illustrates an example block diagram of an attitude correction system.

FIG. 1 illustrates an example block diagram of an attitude correction system. The system 100 as depicted in FIG. 1 includes a gyroscope 102, an accelerometer 104, a magnetometer 106, an attitude module 108, and a correction module 110. In one example, attitude module 108 and correction module 110 can be implemented in software. In another example, gyroscope 102 includes components (e.g., motion sensors to detect motion in different axes, etc) for measuring attitude of the system, accelerometer 104 includes components for detecting acceleration of the system, and magnetometer 106 includes components for measuring magnetic fields around the system. System 100 may be integrated into a number of types of electronic devices, including smartphone devices, laptop devices, tablet computers, PDAs, etc.

Gyroscope 102 is configured to detect an orientation of an electronic device (e.g., a smartphone device, a tablet computer, a PDA, etc.) that includes the system 100 in response to a torque caused by movement of the electronic device. In one example, a Micro Electro-Mechanical System (MEMS) based gyroscope that includes gyroscopic sensors for multiple axes is used to detect orientation of the electronic device. Accelerometer 104 is configured to detect an acceleration of the electronic device. Accelerometer 104 may detect both static acceleration (e.g., a relatively constant force of acceleration such as gravity), and dynamic acceleration that changes over time. Attitude module 108 is configured to determine an attitude of the electronic device based on the attitude signal provided by the gyroscope.

Correction module 110 is configured to receive the acceleration signal generated by accelerometer 104 and the attitude signal provided by the gyroscope 102. Correction module 110, is further configured to identify, based on the received acceleration signal, a period of time where a velocity of the electronic device at the beginning of the period of time and a velocity of the electronic device at the end of the period of time are equal. Correction module 110 is further configured to calculate an attitude correction based on the identified period of time and the detected acceleration of the electronic device during the period of time. Correction module 110 is further configured to provide the attitude correction to attitude module 108. Upon receipt of the attitude correction, attitude module 108 is configured to correct the determined attitude of the electronic device based on the received attitude correction.

Figure 2:
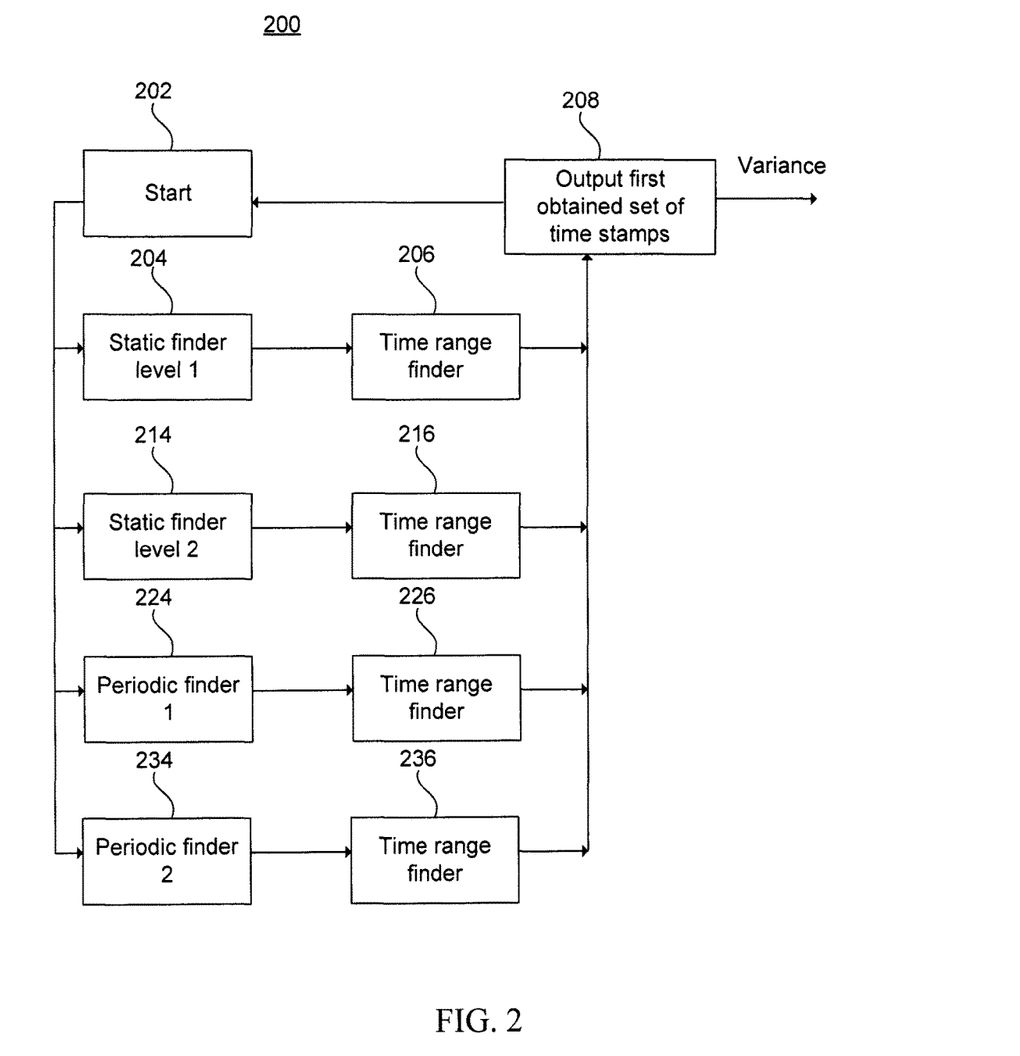
FIG. 2 illustrates an example block diagram for identifying a period of time where velocity of an electronic device at the beginning of the period of time and at the end of the period of time are equal.

FIG. 2 illustrates an example block diagram for identifying a period of time where velocity of an electronic device at the beginning of the period of time and at the end of the period of time are equal. Following start block 202, system 200 initializes static finder level 1 204, time range finder 206, static finder level 2 214, time range finder 216, periodic finder 1 224, time range finder 226, periodic finder 2 234 and time range finder 236. Upon detection of an acceleration and an attitude of the electronic device, static finder level 1 204 periodically stores a detected acceleration value in a signal queue at a first time interval and compares the difference between the detected acceleration value and a previously stored acceleration value with a threshold value. In one example, the detected acceleration value is stored every 0.3 seconds. If the difference is greater than or equal to the threshold value, then static finder level 1 204 and time range finder 206 are reset. If the difference between the detected acceleration value and the previously stored acceleration value is below the threshold value, static finder level 1 204 then determines if time elapsed since initialization of static finder level 1 204 is greater than a second time interval. If time elapsed since initialization of static finder level 1 204 is less than the second time interval, static time finder level 1 204 continues to periodically store a detected acceleration value in a signal queue at a first time interval and compare the difference between the detected acceleration value and a previously stored acceleration value with the threshold value. A minimum time interval for the second time interval may be selected. In one example, the minimum time interval for the second time interval is 1 second. Alternatively, if time elapsed since initialization of static finder level 1 204 is greater or equal to the second time interval, then the beginning of the second time interval and the end of the second time interval are designated as the beginning and the end of a period of time where velocity is equal. Time range finder 206 obtains timestamps of the beginning of the second time interval and the end of the second time interval and outputs the obtained timestamps to block 208.

Upon detection of an acceleration and an attitude of the electronic device, periodic finder 1 224 decomposes a detected acceleration signal into a wavelet. Periodic finder 1 224 then transforms the wavelet into a binary wave based on a threshold. If the transformed binary wave does not have at least two rising edges, periodic finder 224 and time ranger finder 226 resets. If the transformed binary wave has at least 2 rising edges, then successive rising edges of the binary wave are identified as beginning and end of a period of time where the velocity of the electronic device at the beginning of the period of time is equal to the velocity of the electronic device at the end of the period of time. Time range finder 226 timestamps the beginning of the period of time and the end of the period of time and outputs the obtained timestamps to block 208.

In FIG. 2, multiple static finders 204, 214 and corresponding time range finders 206, 216 as well as multiple periodic finders 224, 234 and corresponding time range finders 226, 236 are used to determine a period of time when the velocity of an electronic device at the beginning and at the end of the period of time are equal. The multiple of static finders 204 and 214 and periodic finders 224 and 234 may be used simultaneously. Upon an earliest output of timestamps by a time ranger finder 206, 216, 226, or 236 to block 208, the timestamps used to calculate attitude variance during the second interval of time. The process then returns to start block 202 and each of the static finders, periodic finders, and time range finders are reset.

Figure 3A:
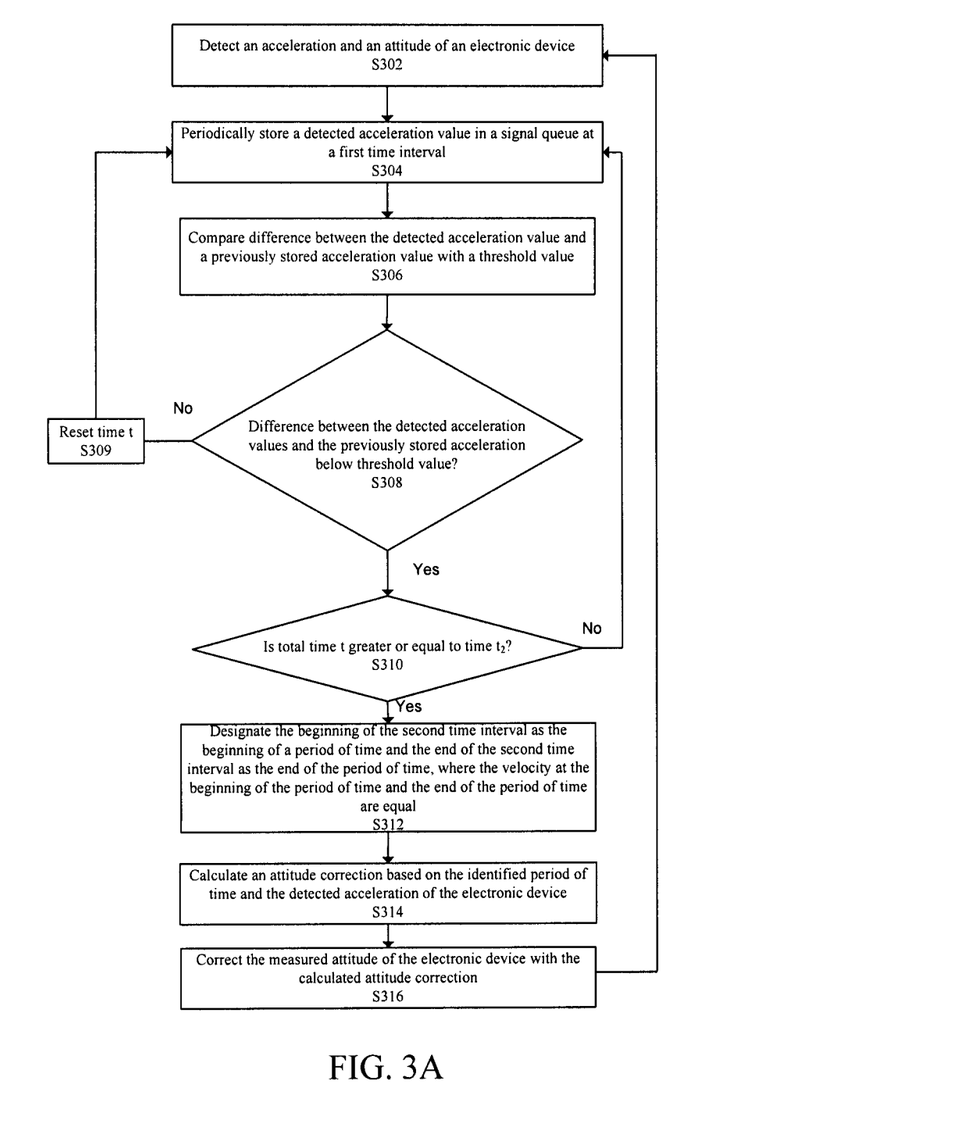
FIG. 3A illustrates an example process for correcting a determined attitude of an electronic device during a period of time when the electronic device is in a static state at the beginning and the end of the period of time.

FIG. 3A illustrates an example process for correcting a determined attitude of an electronic device during a period of time when the electronic device is in a static state at the beginning and the end of the period of time. In one example, the process described in steps S302, S304, S306, S308, S309, S310, and S312 can be performed by a static finder 204, or 214. Acceleration of an electronic device and attitude of the electronic device are detected in block S302. Acceleration of the electronic device may be detected by the accelerometer of the electronic device, and attitude of the electronic device may be detected by the gyroscope of the electronic device.

In block S304, a detected acceleration value is periodically stored in a signal queue at a first time interval. In block S306, difference between the detected acceleration value and a previously stored acceleration value is compared with a threshold value. In one example, the threshold value is a maximum acceleration value for an electronic device for the electronic device to be considered static. In block S308, if the difference between the detected acceleration values and the previously stored acceleration value is not below the threshold value, the process proceeds to block S309, where time is reset, then returns to block S304. Alternatively, if the difference between the detected acceleration value and the stored acceleration value is below the threshold value, the process proceeds to block S310. In block S310, if time t is less than $t_2$, then a second time interval has not elapsed and the process returns to S304. If time t is greater than or equal to time $t_2$, then the second time interval has elapsed and the process proceeds to block S312 where the beginning of the second time interval is designated as the beginning of a period of time and the end of the second time interval is designated as the end of the period of time, where the velocity at the beginning of the period of time and the end of the period of time are equal.

In block S314, the electronic device calculates an attitude correction based on the identified period of time and the detected acceleration of the electronic device. In one example, the attitude correction is calculated by solving equation (8) for $\Delta\varphi$. In block S316, the measured attitude of the electronic device is corrected based on the calculated attitude correction. The process then returns to block S302.

Figure 3B:
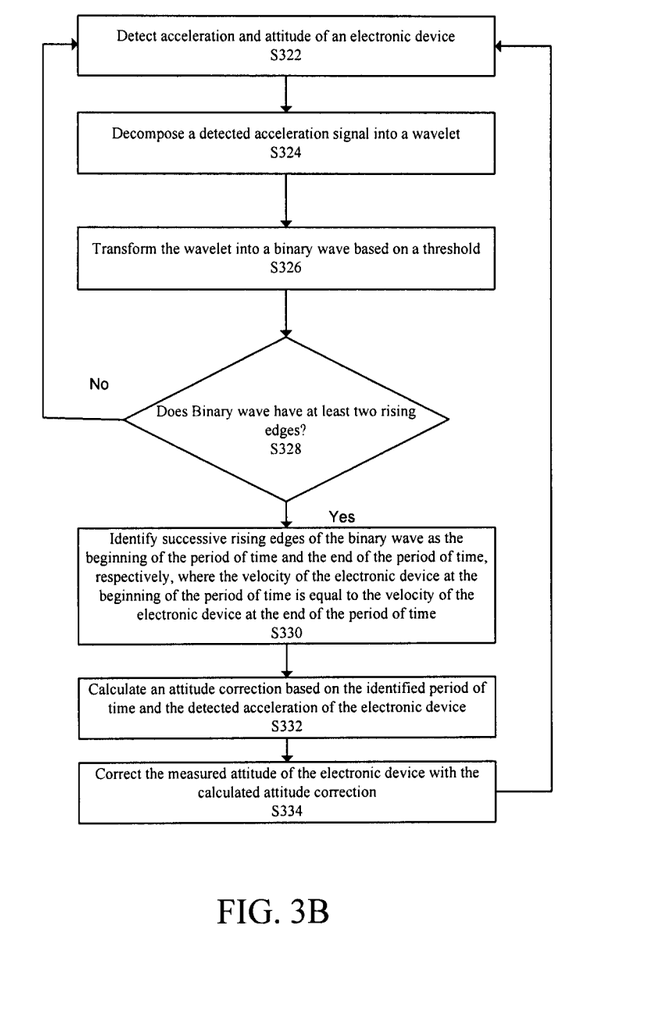
FIG. 3B illustrates an example process for correcting a determined attitude of an electronic device during a period of time when the electronic device is at a common stage of periodic motion at the beginning and end of the period of time.

FIG. 3B illustrates an example process for correcting a determined attitude of an electronic device during a period of time when the electronic device is at a common stage of periodic motion at the beginning and end of the period of time. In one example, the process described in steps S322, S324, S326, S328, and S330 can be performed by a periodic finder 224, or 234.

Figure 4A:
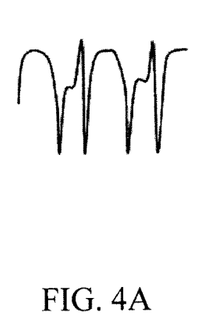
FIG. 4A-4C illustrate example screenshots of a transformation and a decomposition of an acceleration signal to determine a common stage of periodic motion.

Acceleration of an electronic device and attitude of the electronic device are detected in block S322. Acceleration of the electronic device may be detected by the accelerometer of the electronic device, and attitude of the electronic device may be determined by the gyroscope of the electronic device. FIG. 4A illustrates one example of an acceleration signal received from an accelerometer.

Figure 4B:
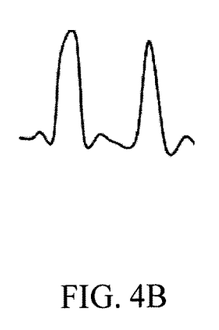
Figure 4C:
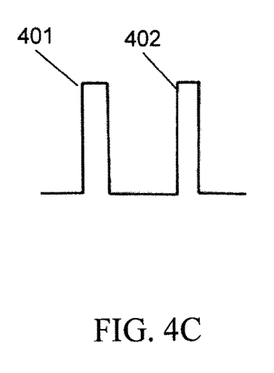

In block S324, a detected acceleration signal is decomposed into a wavelet. In one example, the detected acceleration signal is decomposed using Daubechies wavelet transformation. Other wavelet transformations may be used to decompose the detected acceleration signal into a wavelet. A wavelet may be selected based on the frequency at which the acceleration signals are obtained, the measured values of the acceleration signals and/or the transformation technique used to decompose the acceleration signals. FIG. 4B illustrates one example of a wavelet transformation of the acceleration signal shown in FIG. 4A using a D4 Daubechies wavelet transformation. In block S326, the decomposed wavelet is transformed into a binary wave based on a threshold value. In one example, the threshold is predetermined. In another example the threshold is selected based on the properties of the decomposed wavelet. In another example, the threshold is user selected. The threshold value causes a rising edge of the binary wave to occur at synchronized points of the periodic movement. In one example, successive rising edges of the binary wave must be separated by a threshold period of time (e.g., only rising edges that occur at least 0.5 seconds apart are considered). Different wavelet transformation techniques may be used to transform the decomposed wavelet into a binary wave. FIG. 4C illustrates one example of transforming the decomposed wavelet of FIG. 4B into a binary wave based on a threshold. In block S328, if the transformed binary wave does not have at least two rising edges, the process returns to block S322. Alternatively, if the transformed binary wave has two or more rising edges, the process proceeds to block S330.

In block S330, the electronic device identifies successive rising edges of the binary wave as the beginning of the period of time and the end of the period of time, respectively, where the velocity of the electronic device at the beginning of the period of time is equal to the velocity of the electronic device at the end of the period of time. In FIG. 4C, successive rising edges 401 and 402 of the transformed binary waves are identified as the beginning of a period of time and the end of the period of time, where the electronic device is at a common stage of periodic motion. In block S332, the electronic device calculates an attitude correction based on the identified period of time and the detected acceleration of the electronic device. In one example, attitude correction is calculated by solving equation (8) for $\Delta\varphi$.

In block S334, the measured attitude of the electronic device is corrected based on the calculated attitude correction. The process then returns to block S322.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
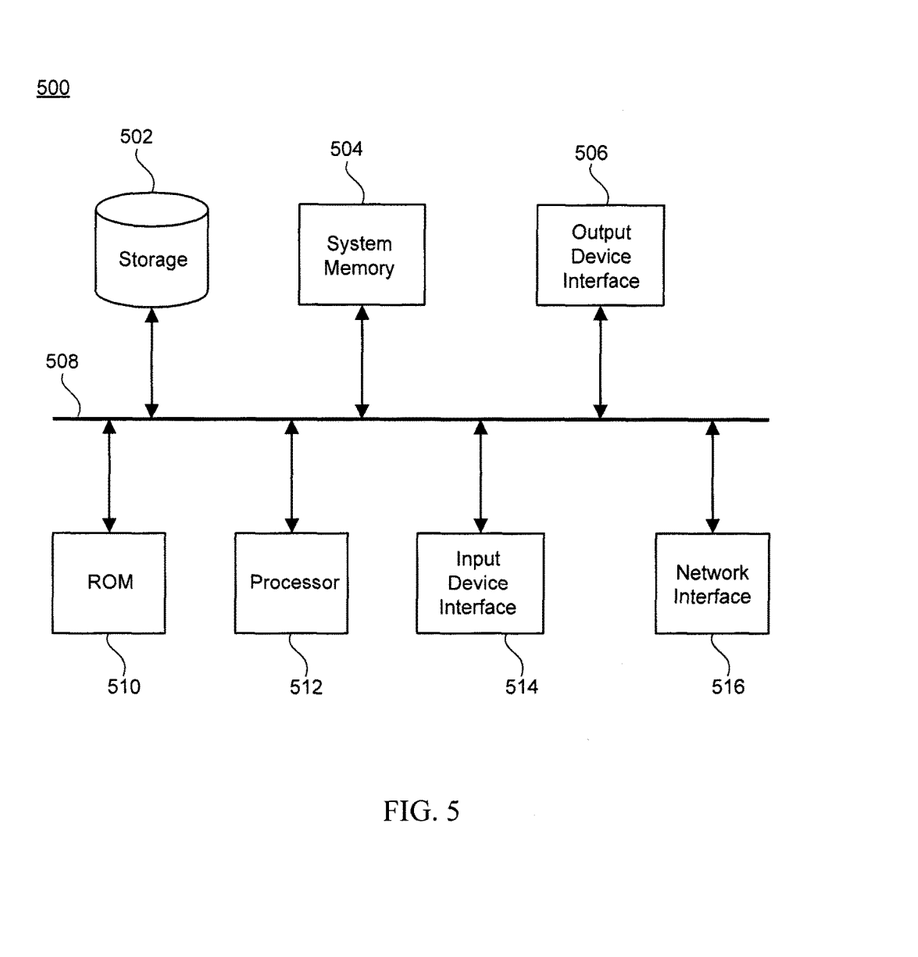
FIG. 5 conceptually illustrates an electronic system with which some implementations of the subject technology are implemented.

FIG. 5 conceptually illustrates an electronic system with which some implementations of the subject technology are implemented. In certain aspects, the computer system 500 may be implemented using hardware or a combination of software and hardware, either in an electronic device or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, an electronic device can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a computer device having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include electronic devices and servers. An electronic device and servers are generally remote from each other. The relationship of the electronic device and server arises by virtue of computer programs running on the respective computers and having an electronic device-electronic device or electronic device-access point relationship to each other. Computer system 500 can be, for example, and without limitation, a touchscreen device, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 502. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method for attitude correction, the method comprising:

detecting, by at least one gyroscope, an attitude of an electronic device;

identifying, by one or more computing devices, a period of time wherein a velocity of the electronic device at the beginning of the period of time and a velocity of the electronic device at the end of the period of time are equal, wherein the velocity of the electronic device changes between the beginning of the period of time and the end of the period of time to enable acceleration of the electronic device to be determined;

detecting, by at least one accelerometer, an acceleration of the electronic device in association with one or more times between the beginning of the period of time and the end of the period of time, the acceleration detected, being non-zero, in association with the one or more times;

calculating, by the one or more computing devices, an attitude correction based on the identified period of time and a detected acceleration of the electronic device in association with the one or more times; and correcting, by the one or more computing devices, the detected attitude of the electronic device with the calculated attitude correction.

2. The computer-implemented method of claim 1, wherein the electronic device is in a static state at the beginning of the period of time and the end of the period of time.

3. The computer-implemented method of claim 2, wherein identifying the period of time comprises:
periodically storing a detected acceleration value in a signal queue at a first time interval;
for each detected acceleration value over a second time interval, comparing a difference between the detected acceleration value and a previously stored acceleration value with a threshold value; and
designating the beginning of the second time interval as the beginning of the period of time and the end of the second time interval as the end of the period of time if the differences between the detected acceleration values and the previously stored acceleration values remain below the threshold value.

4. The computer-implemented method of claim 1, wherein the electronic device is at a common stage of periodic motion at the beginning of the period of time and at the end of the period of time.

5. The computer-implemented method of claim 4, wherein identifying the period of time comprises:
decomposing a detected acceleration signal into a wavelet;
transforming the wavelet into a binary wave based on a threshold; and
identifying successive rising edges of the binary wave as the beginning of the period of time and the end of the period of time, respectively.

6. The computer-implemented method of claim 5, wherein the detected acceleration signal is decomposed using Daubechies wavelet transformation.

7. The computer-implemented method of claim 1, wherein calculating the attitude correction comprising solving:

$$\int_{t1}^{t2} A'_{abs}\, dt = \int_{t1}^{t2} A_{abs} \times \Delta\varphi\, dt = -g(t_2 - t_1) \times \Delta\varphi$$

for $\Delta\varphi$, wherein:
$A'_{abs}$ is a measured acceleration in an absolute coordinate frame,
$A_{abs}$ is a true value of acceleration in an absolute coordinate frame,
$t_1$ is the beginning of the period of time,
$t_2$ is the end of the period of time,
g is a gravitational force, and
$\Delta\varphi$ is an attitude variance of the electronic device during the period of time.

8. A system for attitude correction, the system comprising:
one or more processors, and
a non-transitory machine-readable medium comprising instructions stored therein, which when executed by the processors, cause the processors to perform operations comprising:
detecting, by at least one gyroscope, an attitude of an electronic device;
identifying a period of time wherein a velocity of the electronic device at the beginning of the period of time and a velocity of the electronic device at the end of the period of time are equal, wherein the velocity of the electronic device changes between the beginning of the period of time and the end of the period of time to enable acceleration of the electronic device to be determined;
detecting, by at least one accelerometer, an acceleration of the electronic device in association with one or more times between the beginning of the period of time and end of the period of time, the acceleration detected, being non-zero, in association with the one or more times;
calculating an attitude correction based on the identified period of time and a detected acceleration of the electronic device in association with the one or more times, wherein calculating the attitude correction comprising solving:

$$\int_{t1}^{t2} A'_{abs}\, dt = \int_{t1}^{t2} A_{abs} \times \Delta\varphi\, dt = -g(t_2 - t_1) \times \Delta\varphi$$

for $\Delta\varphi$, wherein:
$A'_{abs}$ is a measured acceleration in an absolute coordinate frame,
$A_{abs}$ is a true value of acceleration in an absolute coordinate frame,
$t_1$ is the beginning of the period of time,
$t_2$ is the end of the period of time,
g is a gravitational force, and
$\Delta\varphi$ is an attitude variance of the electronic device during the period of time; and
correcting the detected attitude of the electronic device with the calculated attitude correction.

9. The system of claim 8, wherein the electronic device is in a static state at the beginning of the period of time and the end of the period of time.

10. The system of claim 9, wherein identifying the period of time comprises:
periodically storing a detected acceleration value in a signal queue at a first time interval;
for each detected acceleration value over a second time interval, comparing a difference between the detected acceleration value and a previously stored acceleration value with a threshold value; and
designating the beginning of the second time interval as the beginning of the period of time and the end of the second time interval as the end of the period of time if the differences between the detected acceleration values and the previously stored acceleration values remain below the threshold value.

11. The system of claim 8, wherein the electronic device is at a common stage of periodic motion at the beginning of the period of time and at the end of the period of time.

12. The system of claim 11, wherein identifying the period of time comprises:
decomposing a detected acceleration signal into a wavelet;
transforming the wavelet into a binary wave based on a threshold; and
identifying successive rising edges of the binary wave as the beginning of the period of time and the end of the period of time, respectively.

13. The system of claim 12, wherein the detected acceleration signal is decomposed using Daubechies wavelet transformation.

14. A non-transitory machine-readable medium comprising instructions stored therein, which when executed by a processor, cause the processor to perform operations comprising:
- detecting an attitude of a smartphone device, wherein the attitude of the smartphone device is detected by a gyroscope component of the smartphone device;
- identifying a period of time wherein a velocity of the smartphone device at the beginning of the period of time and a velocity of the smartphone device at the end of the period of time are equal, wherein the velocity of the smartphone device changes between the beginning of the period of time and the end of the period of time such that acceleration of the smartphone device can be determined;
- detecting, by an accelerometer component of the smartphone device, an acceleration of the smartphone device in association with one or more times between the beginning of the period of time and end of the period of time, the acceleration detected, being non-zero, in association with the one or more times;
- calculating an attitude correction based on the identified period of time and the detected acceleration of the smartphone device in association with the one or more times, wherein calculating the attitude correction comprising solving:

$$\int_{t1}^{t2} A'_{abs} dt = \int_{t1}^{t2} A_{abs} \times \Delta\varphi dt = -g(t_2 - t_1) \times \Delta\varphi$$

for $\Delta100$, wherein:
- $A'_{abs}$ is a measured acceleration in an absolute coordinate frame,
- $A_{abs}$ is a true value of acceleration in an absolute coordinate frame,
- $t_1$ is the beginning of the period of time,
- $t_2$ is the end of the period of time,
- g is a gravitational force, and
- $\Delta\varphi$ is an attitude variance of the smartphone device during the period of time; and
- correcting the detected attitude of the smartphone device with the calculated attitude correction.

15. The machine-readable medium of claim 14, wherein the electronic device is at a common stage of periodic motion at the beginning of the period of time and at the end of the period of time.

16. The machine-readable medium of claim 15, wherein identifying the period of time comprises:
- periodically storing a detected acceleration value in a signal queue at a first time interval;
- for each detected acceleration value over a second time interval, comparing a difference between the detected acceleration value and a previously stored acceleration value with a threshold value; and
- designating the beginning of the second time interval as the beginning of the period of time and the end of the second time interval as the end of the period of time if the differences between the detected acceleration values and the previously stored acceleration values remain below the threshold value.

17. The machine-readable medium of claim 14, wherein the electronic device is at a common stage of periodic motion at the beginning of the period of time and at the end of the period of time.

18. The machine-readable medium of claim 17, wherein identifying the period of time comprises:
- decomposing a detected acceleration signal into a wavelet;
- transforming the wavelet into a binary wave based on a threshold; and
- identifying successive rising edges of the binary wave as the beginning of the period of time and the end of the period of time, respectively.

19. The machine-readable medium of claim 18, wherein the detected acceleration signal is decomposed using Daubechies wavelet transformation.

20. An attitude correction system comprising:
- an accelerometer configured to detect acceleration of an electronic device and provide an acceleration signal;
- a gyroscope configured to detect an orientation of the electronic device and provide an attitude signal based on the detected orientation;
- an attitude module configured to determine an attitude of the electronic device based on the attitude signal provided by the gyroscope;
- a correction module configured to receive the acceleration signal from the accelerometer and the attitude signal from the gyroscope,
- wherein the correction module is further configured to identify, based on the received acceleration signal and the received attitude signal, a period of time wherein a velocity of the electronic device at the beginning of the period of time and a velocity of the electronic device at the end of the period of time are equal, wherein the velocity of the electronic device changes between the beginning of the period of time and the end of the period of time such that acceleration of the electronic device can be determined,
- and wherein the correction module is further configured to calculate an attitude correction based on the identified period of time and the detected acceleration of the electronic device in assocation with one or more times after the beginning of the period of time and before the end of the period of time and provide the attitude correction to the attitude module, wherein the detected acceleration in association with the one or more times is non-zero; and
- wherein the attitude module is further configured to correct the determined attitude of the electronic device based on the attitude correction.

* * * * *